T. J. HENNESSY & J. QUINN.
Street-Sprinkling Apparatus.
No. 218,024.  Patented July 29, 1879.
FIG.1.
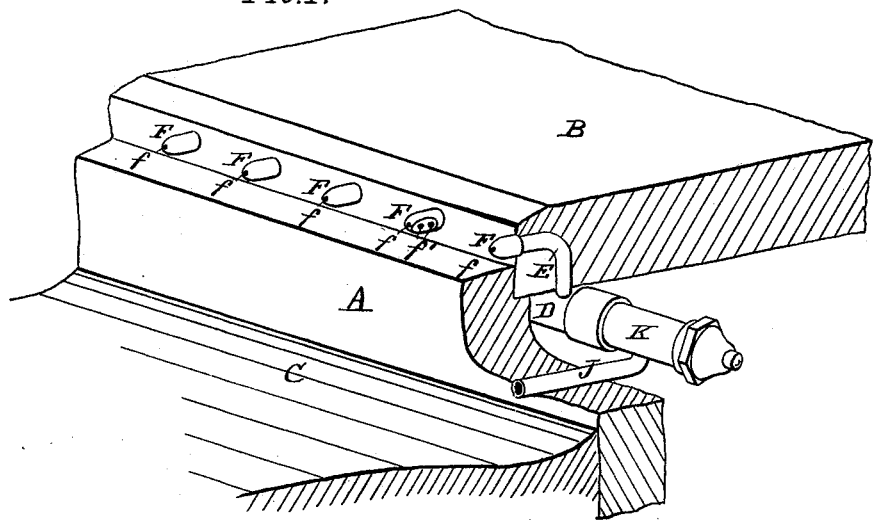
FIG.2.
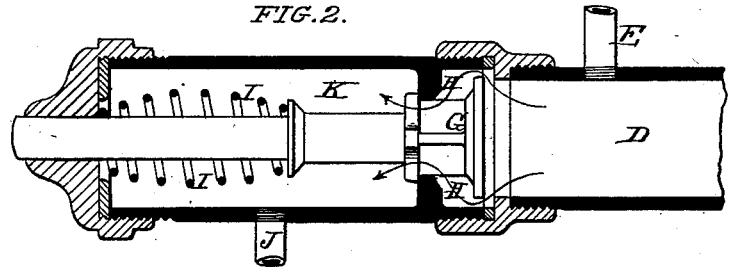
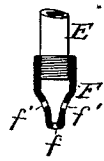
FIG.3.
FIG.4.
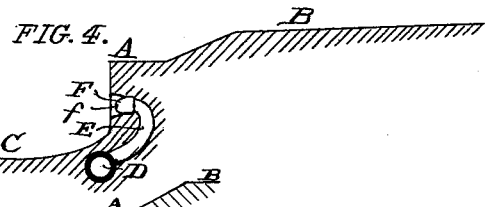
ATTEST:
Geo H Knight
Walter Allen
FIG.5.
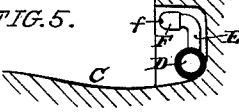
INVENTOR:
Thomas J. Hennessy
John Quinn
By Knight Bros.
Attys.

UNITED STATES PATENT OFFICE.

THOMAS J. HENNESSY AND JOHN QUINN, OF ST. LOUIS, MISSOURI, ASSIGNORS TO DANA MANSFIELD, OF SAME PLACE.

IMPROVEMENT IN STREET-SPRINKLING APPARATUS.

Specification forming part of Letters Patent No. 218,024, dated July 29, 1879; application filed April 24, 1879.

*To all whom it may concern:*

Be it known that we, THOMAS J. HENNESSY and JOHN QUINN, both of the city of St. Louis, in the State of Missouri, have invented a certain new and useful Improvement in Street-Sprinkling Apparatus, of which the following is a full, clear, and exact description, reference being had to the accompanying drawings, forming part of this specification.

Our invention is an improvement on Patent No. 212,719, granted to Dana Mansfield, and dated the 25th of February, 1879.

Our improvement consists in the combination, with an inclosed main pipe, of a number of small pipes, extending to the surface and having removable caps with jet-holes therein.

Our invention also consists in the combination of said main pipe with an automatic waste-valve, closing with the pressure within the pipe, and opening by action of a spiral spring, to allow the water to waste from the pipe when the pressure is removed by the shutting off of the water.

Figure 1 is a perspective view. Fig. 2 is a detail section of valve. Fig. 3 is a detail section of nozzle. Fig. 4 is a section showing modification. Fig. 5 is a section of another modification.

The curb-stone is shown at A, and a portion of the remainder of the sidewalk at B. The gutter is seen at C. D is a water-pipe, in communication with some source of supply under pressure sufficient to project the jets of water into the street. The pipe D is preferably placed beneath the surface, so that the water in it will not be liable to freeze, and to preserve the pipe from injury.

The pipe D has at intervals nozzle-pipes E, extending to the surface, where they have jet-caps F, with small perforations or jet-holes $f$ $f'$, the former in line, or nearly in line, with that end of the nozzle-pipe, and the latter oblique thereto. These removable nozzle-caps impart to the apparatus several advantages. They protect the nozzle-pipes from injury, and in case any of them get injured in any way they can be readily removed and new ones put in their place in a very short time. Another advantage is, that it gives a very ready means for making the jets to conform to the requirements of the particular case—for instance, as to the width of the street or at cross-streets or alleys. In the first place the jet-holes might be made larger or smaller, or more or less numerous, and some of them inclined to throw the jets to a greater distance. In the latter case the jet-holes would be so made as to throw the water upon the part of the street having no flanking sidewalk, and consequently no sprinkling-pipe beside it.

It will be understood that the removable and interchangeable caps F give an easy means for making these modifications in the jets without modification of any other part of the apparatus, except, perhaps, the introduction of additional nozzles at the corners of the intersection streets and a curving of the pipe D around the corner.

The nozzle-pipes may be arranged in either of the ways shown in the drawings, or in any other way, to extend from the pipe D beneath the surface to a position for the delivery of the water-jets.

In Fig. 1 the pipe D is shown placed inside the curbing A and beneath the sidewalk B, and the nozzle-pipes extend up to the rear of the curbing and the jets are discharged over it.

In Fig. 4 the pipe D is located beneath the gutter, and the nozzle-pipes extend up through channels or recesses $a$, formed for them in the face of the curb-stone.

We do not confine ourselves to any manner as to the position of the pipe D, and the consequent modification of the jet-pipes, as it is evident that these features admit of indefinite modification without departing from the principle of the invention.

The waste-valve G closes with the pressure of the water in the pipe against its seat H.

When the supply of water is shut off from the pipe D, the spring I forces the valve away from its seat, as shown in Fig. 2, and the water escapes, taking the course shown by the arrows.

J is the waste-pipe, extending from the valve box or casing K to the gutter C, or to any other suitable place below the level of the pipe and valve-box.

In the modification shown in Fig. 5, the curb A projects somewhat over the gutter, leaving a recess, in which the pipe D is placed. In this case the nozzle-pipes F may be extended through recesses in the curb, as shown.

We claim as our invention—

1. The combination, in a street-sprinkling apparatus, of the main pipe D, nozzle-pipes E, and removable jet-caps or nozzles F, substantially as set forth.

2. The combination, with the water-pipe D, of the valve G, closing with the pressure in said pipe and opened by spring I, all constructed substantially as and for the purpose set forth.

THOS. J. HENNESSY.
JOHN QUINN.

Witnesses:
SAML. KNIGHT,
GEO. H. KNIGHT.